(12) United States Patent
Fanfelle et al.

(10) Patent No.: US 8,937,898 B2
(45) Date of Patent: *Jan. 20, 2015

(54) WIRELESS MULTICAST PROXY
(71) Applicant: Marvell World Trade Ltd., St. Michael (BB)
(72) Inventors: Robert Fanfelle, Woodside, CA (US); Raja Banerjea, Sunnyvale, CA (US)
(73) Assignee: Marvell World Trade Ltd., St. Michael (BB)
( * ) Notice: Subject to any disclaimer, the term of this patent is extended or adjusted under 35 U.S.C. 154(b) by 68 days.

This patent is subject to a terminal disclaimer.

(21) Appl. No.: 13/769,696
(22) Filed: Feb. 18, 2013
(65) Prior Publication Data

US 2014/0233446 A1 Aug. 21, 2014

Related U.S. Application Data

(63) Continuation of application No. 12/012,196, filed on Jan. 31, 2008, now Pat. No. 8,379,559.
(60) Provisional application No. 60/867,329, filed on Feb. 7, 2007.

(51) Int. Cl.
*H04H 20/71* (2008.01)
*H04W 4/06* (2009.01)
(52) U.S. Cl.
CPC ...................................... *H04W 4/06* (2013.01)
USPC ........................................................ 370/312
(58) Field of Classification Search
USPC ......... 370/312, 432, 329, 401, 390, 468, 351, 370/356; 709/104, 238, 231
See application file for complete search history.

(56) References Cited

U.S. PATENT DOCUMENTS 7,031,326 B1 4/2006 Shur et al.

7,420,942 B2 9/2008 Wang
(Continued)

FOREIGN PATENT DOCUMENTS

EP 1 564 930 8/2005
JP 2010-242962 9/1998
(Continued)

OTHER PUBLICATIONS

IEEE Std 802.11k/D2.0, Feb. 2005 (Draft Amendment to IEEE Std 802.11™, 1999 Edition Reaff 2003, as amended by IEEE Stds 802.11a™-1999, 802.11b™-1999,802.11b™-1999/Cor Jan. 2001, 802.11d™-2001, 802.11g™-2003, 802.11h™-2003, 802.11i™-2004); Draft Amendment to Standard for Information Technology—Telecommunications and Information Exchange Between Systems—LAN/MAN Specific Requirements; Part 11: Wireless Medium Access Control (MAC) and Physical layer (PHY) specifications; Amendement 7: Radio Resource Measurement; Sponsored by the IEEE 802 Committee of the IEEE Computer Society; 124 pages.
(Continued)

*Primary Examiner* — Chi H Pham
*Assistant Examiner* — Alexander O Boakye (57) ABSTRACT

An access point including a snoop circuit to generate a table including a plurality of entries, each entry associating a MAC address of a wireless client with a multicast IP address; to enable multicast traffic for a first wireless client in response to receiving a first message from the first wireless client by i) adding an entry to the table for the first wireless client in response to the entry not existing in the table, and ii) starting a timeout timer for the first wireless client, or by restarting the timeout timer in response to the entry for the first wireless client existing in the table; and to keep the multicast traffic for the first wireless client enabled as long as the timeout timer is reset before expiring. An output circuit transmits a packet to the first wireless client if the multicast traffic for the first wireless client is enabled.

14 Claims, 9 Drawing Sheets

(56) References Cited

U.S. PATENT DOCUMENTS

| | | |
|---|---|---|
| 8,379,559 B2 * | 2/2013 | Banerjea et al. ............ 370/312 |
| 2002/0143951 A1 | 10/2002 | Khan et al. |
| 2003/0012202 A1 | 1/2003 | Fukutomi |
| 2004/0258003 A1 | 12/2004 | Kokot et al. |
| 2005/0002395 A1 | 1/2005 | Kondo |
| 2005/0076145 A1 | 4/2005 | Ben-Zvi et al. |
| 2006/0007930 A1 | 1/2006 | Dorenbosch |
| 2007/0002859 A1 | 1/2007 | Corson |
| 2007/0097971 A1 | 5/2007 | Jang et al. |
| 2007/0140119 A1 | 6/2007 | Cetin et al. |
| 2009/0262677 A1 | 10/2009 | Banerjea et al. |

FOREIGN PATENT DOCUMENTS

| | | |
|---|---|---|
| JP | 2006-101259 | 4/2006 |
| JP | 2006-237828 | 9/2006 |
| WO | 2005/036818 | 4/2005 |
| WO | 2006/027380 | 3/2006 |
| WO | 2008/002294 | 1/2008 |

OTHER PUBLICATIONS

IEEE P802.11k™/D10.0, Nov. 2007; Draft Standard for Information Technology—Telecommunications and information exchange between systems—local and metropolitan area networks- Specific requirements; Part 11: Wireless LAN Medium Access Control (MAC) and Physical layer (PHY) specifications; Amendment 1: Radio Resource Measurement of Wireless LAN's; Sponsor LAN/MAN Standards Committee of the IEEE Computer Society; 223 pages.

IEEE P802.11v/D1.02, Sep. 2007; Draft Standard for Information Technology-Telecommunications and information exchange between systems—Local and metropolitan area networks- Specific requirements; Part 11: Wireless LAN Medium Access Control (MAC) and Physical layer (PHY) specifications; Amendment 9: Wireless Network Management; Prepared by the 802.11 Working Group of the IEEE 802 Committee; 204 pages.

IEEE P802.11w™/D4.0, Nov. 2007; Draft Standard for Information Technology-Telecommunications and information exchange betweem systems—Local and metropolitan area networks- Specific requirements; Part 11: Wireless LAN Medium Access Control (MAC) and Physical layer (PHY) specifications; Amendment 5: Protected Management Frames; Prepared by: IEEE 802 Committee of the IEEE Computer Society; 63 pages.

ANSI/IEEE Std 802.11, 1999 Edition; Information technolgy—Telecommunications and information exchange between systems—Local and metropolitan area networks—Specific requirements—Part 11: Wireless LAN Medium Access Control (MAC) and Physical Layer (PHY) Specifications; LAN/WAN Standards Committee of the IEEE Computer Society; 531 pages.

IEEE Std.11a-1999 (Supplement to IEEE Std 802.11-1999) [Adopted by ISO/IEC and redesignated as ISO/IEC 8802-11: 1999/Amd 1:2000 (E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999 IEEE-SA Standards Board; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; May 2005; 131 pages.

IEEE Std 802.11i™-2004 [Amendment to IEEE Std 802.11™, 1999 Edition (Reaff 2003) as amended by IEEE Stds 802.11a™-1999, 802.11b™-1999, 802.11b™-1999/Cor Jan. 2001, 802.11d™-2001, 802.11g™-2003, and 802.11h™-2003] IEEE Standard for Information technology- Telecommunications and information exchange between systems- Local andmetropolitan area networks- Specific requirements—Part 11: Wireless LAN Medium Access Control (MAC) and Physical Layer (PHY) specifications; Amendment 6: Medium Access Control (MAC) Security Enhancements; LAN/MAN Standards Committee of the IEEE Computer Society; Jul. 23, 2004; 190 pages.

IEEE P802.11e/D11.0, Oct. 2004 (Amendment to ANSI/IEEE Std 802.11®-1999 (2003 Reaff) edition as amended by IEEE Std 802.11g-2003, IEEE Stad 802.11h-2003 and IEEE 802.11i-2004); IEEE Standard for Information technology- Telecommunications and information exchange between systems- Local and metropolitan area networks- Specific requirements—Part 11: Wireless Medium Access Control (MAC) and Physical Layer (PHY) specifications: Amendment 7: Medium Access Control (MAC) Quality of Service (Qos) Enhancements; LAN/MAN Committee of the IEEE Computer Society; 195 pages.

Delivering IPTV with the Window Media Platform; Microsoft Corporation; Nov. 2003; 31 pages.

IGMP, Internet Group Management Protocol; networksorcery.com/enp/protocol/igmp.htm; Apr. 12, 2007; 12 pages.

Deering, "Host Extension for IP Manufacturing" (RFC 1112), Aug. 1989, Network working group, pp. 1-15.

An Implementation of the Broadband Home Gateway Supporting Multi-Channel IPTV Service by Wan-Ki Park, et al., Consumer Electronics, 2006, ISCE '06. 2006 IEEE Tenth Internatioanl Symposium on St. Petersburg, Russia 28-01 Jun. 2006, Piscataway, NJ, USA, IEEE, Jun. 28, 2006, pp. 1-5.

International Search Report dated Aug. 8, 2008 from PCT/US2008/001624 (6 pgs).

Summary of Notice of Reasons for Rejection, JP Application No. 2009-549101, Ryuka Law Firm, Jul. 24, 2012, 2 pages.

* cited by examiner

WIRELESS MULTICAST PROXY

CROSS-REFERENCE TO RELATED APPLICATIONS

This is a continuation of U.S. patent application Ser. No. 12/012,196, filed on Jan. 31, 2008, which claims the benefit of U.S. Provisional Patent Application No. 60/867,329, filed on Feb. 7, 2007. The entire disclosures of the above referenced applications are incorporated herein by reference.

BACKGROUND

The present invention relates generally to data communications. More particularly, the present invention relates to a wireless multicast proxy.

Wireless local-area networks (WLANs) are increasingly popular for distributing data within the home. Furthermore, broadband Internet media delivery services are becoming increasingly popular in the home. Many of these services, such as Internet Protocol Television (IPTV), use multicast packets for transport of the media data. However, because multicast packets are not acknowledged in a WLAN, the multicast packets are subject to a high error rate. This high error rate significantly reduces the quality of the media, and so renders WLANs unsuitable for distributing multicast packets of media.

SUMMARY

In general, in one aspect, an embodiment features an apparatus comprising: an input circuit adapted to receive a first packet of data, wherein the first packet has an Internet Protocol (IP) multicast destination address; a controller adapted to identify one or more wireless clients based on the IP multicast destination address and unicast media access control (MAC) addresses of the one or more wireless clients; a packet circuit adapted to generate one or more second packets of the data, wherein each of the second packets has one of the unicast MAC addresses as a MAC destination address; and a wireless output circuit adapted to wirelessly transmit the one or more second packets of the data.

Embodiments of the apparatus can include one or more of the following features. Some embodiments comprise a multicast snoop circuit adapted to generate a table relating the MAC addresses of the wireless clients with multicast IP addresses; wherein the controller identifies the one or more wireless clients based on the table and the IP multicast address of the first packet of the data. In some embodiments, the multicast snoop circuit generates the table based on Internet Group Management Protocol (IGMP) messages received from the wireless clients. Some embodiments comprise a wireless access point comprising the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features an apparatus comprising: input means for receiving a first packet of data, wherein the first packet has an Internet Protocol (IP) multicast destination address; controller means for identifying one or more wireless clients based on the IP multicast destination address and unicast media access control (MAC) addresses of the one or more wireless clients; packet means for generating one or more second packets of the data, wherein each of the second packets has one of the unicast MAC addresses as a MAC destination address; and wireless output means for wirelessly transmitting the one or more second packets of the data.

Embodiments of the apparatus can include one or more of the following features. Some embodiments comprise multicast snoop means for generating a table relating the MAC addresses of the wireless clients with multicast IP addresses; wherein the controller means identifies the one or more wireless clients based on the table and the IP multicast address of the first packet of the data. In some embodiments, the multicast snoop means generates the table based on Internet Group Management Protocol (IGMP) messages received from the wireless clients. Some embodiments comprise a wireless access point comprising the apparatus. In some embodiments, the wireless access point is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features a method comprising: receiving a first packet of data, wherein the first packet has an Internet Protocol (IP) multicast destination address; identifying one or more wireless clients based on the IP multicast destination address and unicast media access control (MAC) addresses of the one or more wireless clients; generating one or more second packets of the data, wherein each of the second packets has one of the unicast MAC addresses as a MAC destination address; and wirelessly transmitting the one or more second packets of the data.

Embodiments of the method can include one or more of the following features. Some embodiments comprise generating a table relating the MAC addresses of the wireless clients with multicast IP addresses; wherein the one or more wireless clients are identified based on the table and the IP multicast address of the first packet of the data. In some embodiments, the table is generated based on Internet Group Management Protocol (IGMP) messages received from the wireless clients. In some embodiments, the method is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features a computer program executable on a processor, the computer program comprising: instructions for identifying one or more wireless clients based on unicast media access control (MAC) addresses of the one or more wireless clients and an Internet Protocol (IP) multicast destination address in a first packet; instructions for generating one or more second packets of the data, wherein each of the second packets has one of the unicast MAC addresses as a MAC destination address; and instructions for causing wireless transmission of the one or more second packets of the data.

Embodiments of the computer program can include one or more of the following features. Some embodiments comprise instructions for generating a table relating the MAC addresses of the wireless clients with multicast IP addresses; wherein the one or more wireless clients are identified based on the table and the IP multicast address of the first packet of the data. In some embodiments, the table is generated based on Internet Group Management Protocol (IGMP) messages received from the wireless clients. In some embodiments, the computer program is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features an apparatus comprising: a wireless input circuit adapted to wirelessly receive a packet of data, wherein the packet has an Internet Protocol (IP) multicast address as an IP destination address and a unicast media access control (MAC) address of the apparatus as a MAC destination address; an address conversion circuit adapted to generate a multicast MAC address based on the IP multicast destination address; an address replacement circuit adapted to replace the MAC destination address of the packet with the multicast MAC address; and an output circuit adapted to transmit the packet of data.

Embodiments of the apparatus can include one or more of the following features. In some embodiments, the address conversion circuit replaces bits of the unicast MAC address with bits of the IP multicast address. Some embodiments comprise a wireless client comprising the apparatus. In some embodiments, the wireless client is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features an apparatus comprising: wireless input means for wirelessly receiving a packet of data, wherein the packet has an Internet Protocol (IP) multicast address as an IP destination address and a unicast media access control (MAC) address of the apparatus as a MAC destination address; address conversion means for generating a multicast MAC address based on the IP multicast destination address; address replacement means for replacing the MAC destination address of the packet with the multicast MAC address; and output means for transmitting the packet of data.

Embodiments of the apparatus can include one or more of the following features. In some embodiments, the address conversion means replaces bits of the unicast MAC address with bits of the IP multicast address. Some embodiments comprise a wireless client comprising the apparatus. In some embodiments, the wireless client is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features a method comprising: wirelessly receiving a packet of data into an apparatus, wherein the packet has an Internet Protocol (IP) multicast address as an IP destination address and a unicast media access control (MAC) address of the apparatus as a MAC destination address; generating a multicast MAC address based on the IP multicast destination address; replacing the MAC destination address of the packet with the multicast MAC address; and transmitting the packet of data from the apparatus.

Embodiments of the method can include one or more of the following features. Some embodiments comprise replacing bits of the unicast MAC address with bits of the IP multicast address. In some embodiments, the method is compliant with all or part of IEEE standard 802.11, including draft and approved amendments 802.11a, 802.11b, 802.11e, 802.11g, 802.11i, 802.11k, 802.11n, 802.11v, and 802.11w.

Some embodiments comprise a computer program executable on a processor, the computer program comprising: instructions for generating a multicast MAC address based on an Internet Protocol (IP) multicast destination address, wherein an apparatus receives a packet of data, wherein the packet has the IP multicast address as an IP destination address and a unicast media access control (MAC) address of the apparatus as a MAC destination address; instructions for replacing the MAC destination address of the packet with the multicast MAC address; and instructions for causing transmission of the packet of data from the apparatus.

Embodiments of the computer program can include one or more of the following features. Some embodiments comprise instructions for replacing bits of the unicast MAC address with bits of the IP multicast address. In some embodiments, the computer program is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, an embodiment features a wireless packet comprising: a header comprising an Internet Protocol (IP) destination address comprising an IP multicast address, and a Media Access Control (MAC) destination address comprising a MAC unicast address; and a payload.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide a wireless multicast proxy to receive Internet Protocol (IP) multicast packets of data, identify wireless clients for the data, and wirelessly transmit unicast packets of the data to the wireless clients. The wireless clients for the data can be identified based on a multicast table relating media access control (MAC) addresses of the wireless clients with multicast IP addresses. The wireless multicast proxy can include a multicast snoop circuit to generate the multicast table by snooping Internet Group Management Protocol (IGMP) messages transmitted by the wireless clients. The proxy can be implemented as part of a wireless access point, which can be compliant with all or part of IEEE standard 802.11, including draft and approved amendments 802.11a, 802.11b, 802.11e, 802.11g, 802.11i, 802.11k, 802.11n, 802.11v, and 802.11w.

Figure 1:
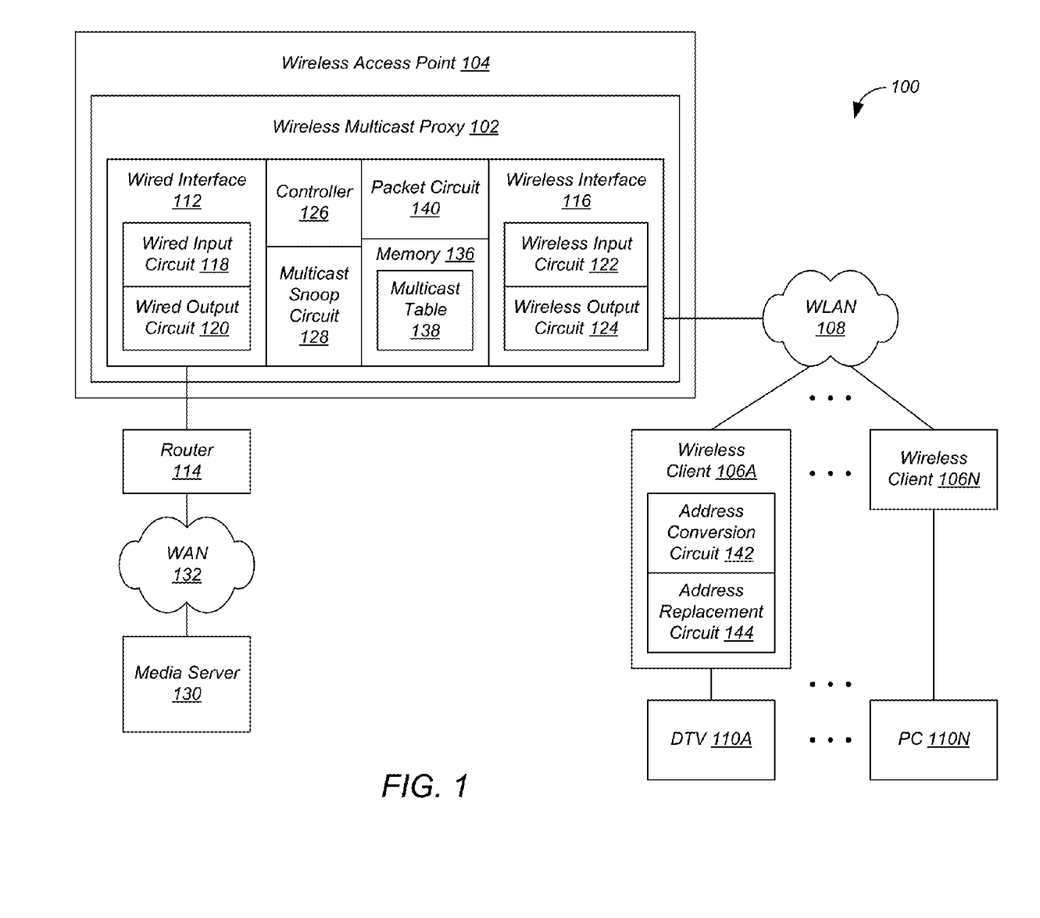
FIG. 1 shows a data communication system including a wireless multicast proxy according to an embodiment of the present invention.

FIG. 1 shows a data communication system 100 including a wireless multicast proxy 102 according to an embodiment of the present invention. Although in the described embodiments, the elements of data communication system 100 are presented in one arrangement, other embodiments may feature other arrangements, as will be apparent to one skilled in the relevant arts based on the disclosure and teachings provided herein. For example, the elements of data communication system 100 can be implemented in hardware, software, or combinations thereof.

In data communication system 100, wireless multicast proxy 102 is implemented as part of a wireless access point 104 in communication with one or more wireless clients 106A-N over a wireless local-area network (WLAN) 108. However, in other embodiments, wireless multicast proxy 102 need not be implemented as part of a wireless access point 104. In addition, the wireless network need not be implemented as a WLAN 108.

Each wireless client 106 communicates with a client device 110. For example, wireless client 106A communicates with a digital television (DTV) 110A, while wireless client 106N communicates with a personal computer (PC) 110N. Client devices 110 can be used to render media data sent by wireless multicast proxy 110. For example, DTV 110A can present audio and video based on packets of media data such as IPTV and the like.

Wireless multicast proxy 102 includes a controller 126, a multicast snoop circuit 128, a memory 136, and a packet circuit 140. Memory 136 stores a multicast table 138 relating Media Access Control (MAC) addresses of wireless clients 106 with multicast IP addresses, as described below. Wireless multicast proxy 102 also includes a wired interface 112 in communication with a router 114, and a wireless interface 116 in communication with WLAN 108. Router 114 communicates with a media server 130 over a wide-area network (WAN) 132 such as the Internet. Wired interface 112 includes a wired input circuit 118 and a wired output circuit 120. Wired interface 112 can be implemented as an Ethernet port or the like. Wireless interface 116 includes a wireless input circuit 122 and a wireless output circuit 124. Wireless interface 116 can be compliant with all or part of IEEE standard 802.11, including draft and approved amendments 802.11a, 802.11b, 802.11e, 802.11g, 802.11i, 802.11k, 802.11n, 802.11v, and 802.11w.

In some embodiments, it is desirable to convert the unicast MAC destination address of a packet received from wireless multicast proxy 102 to a multicast MAC address. In those embodiments, a wireless client 106 can include an address conversion circuit 142 to generate a multicast MAC address based on the IP multicast address of the packet, and an address replacement circuit 144 to replace the unicast MAC destination address with the multicast MAC address, as discussed below.

Figure 2:
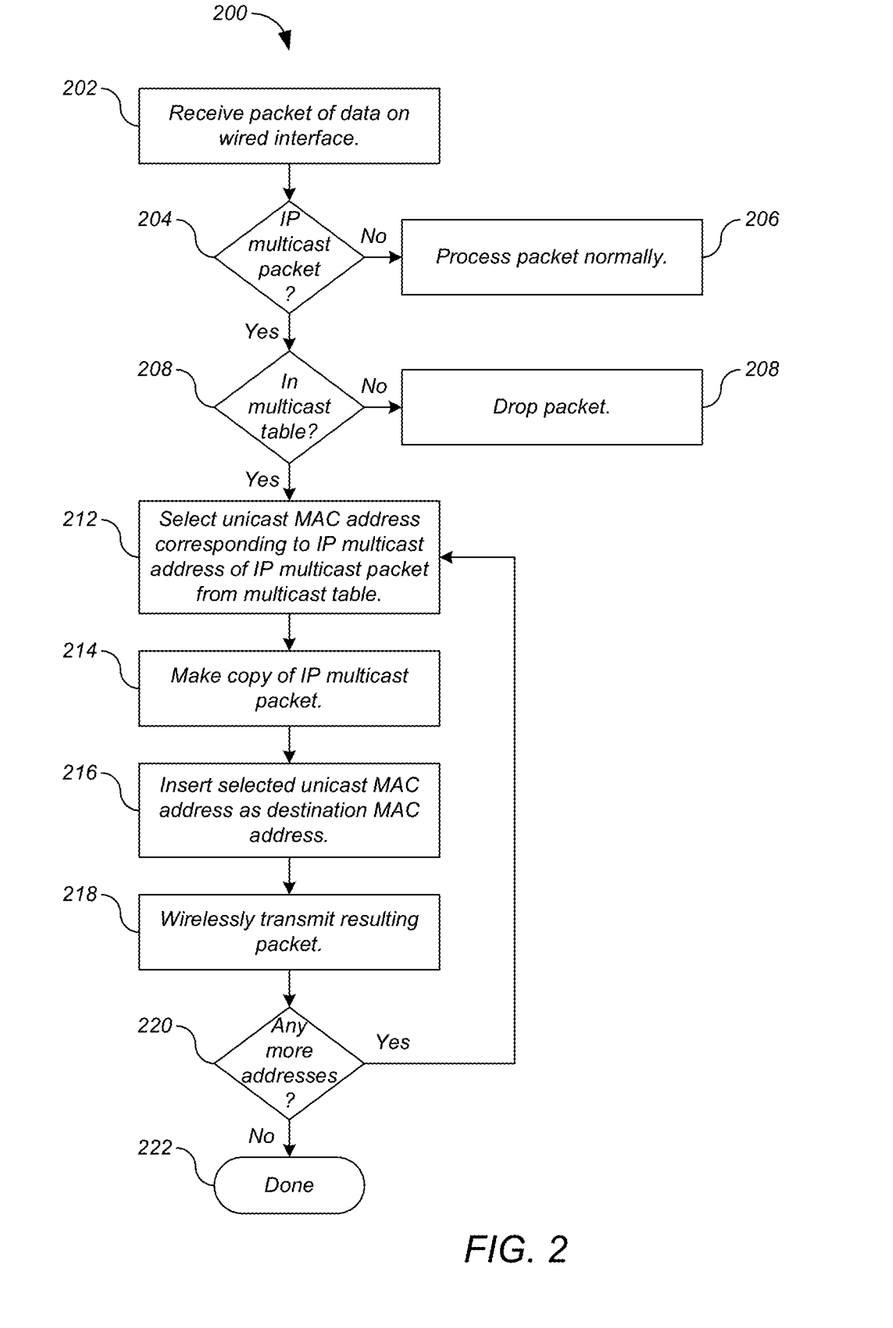
FIG. 2 shows a wireless multicast proxy process for the data communication system of FIG. 1 according to an embodiment of the present invention.

FIG. 2 shows a wireless multicast proxy process 200 for data communication system 100 of FIG. 1 according to an embodiment of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, wireless multicast proxy 102 receives a packet of data on wired interface 112 (step 202). In particular, wired input circuit 118 of wired interface 112 receives the packet of data from WAN 132. Controller 126 of wireless multicast proxy 102 determines whether the packet is an IP multicast packet (step 204), that is, whether the packet has an IP multicast destination address. If the packet is not an IP multicast packet, wireless multicast proxy 102 processes the packet normally (step 206). For example, the packet is sent by wireless interface 116 to the destination wireless client 106.

But if the packet is an IP multicast packet, wireless multicast proxy 102 determines whether the IP multicast address of the IP multicast packet is listed in multicast table 138 (step 208). Table 1 shows an example multicast table 138.

TABLE 1

| Multicast IP Address | Unicast MAC Address |
|---|---|
| Multicast IP Address 1 | Count 1 <number of MAC addresses> |
| | Unicast MAC Address 1 |
| | Unicast MAC Address 2 |
| | Unicast MAC Address 3 |
| Multicast IP Address 2 | Count 2 <number of MAC addresses> |
| | Unicast MAC Address 4 |
| | Unicast MAC Address 5 |

Referring to the example multicast table 138 of Table 1, for each multicast group, Table 1 lists the IP multicast address, the number of unicast MAC addresses in the multicast group, and the unicast MAC addresses. Of course, multicast table 138 can have arrangements other than that shown in Table 1. Multicast table 138 can be populated in any manner. In some embodiments, multicast table 138 is populated by snooping traffic, as described below.

Referring again to FIG. 2, if the IP multicast destination address of the IP multicast packet is not listed in multicast table 138, wireless multicast proxy 102 drops the IP multicast packet (step 210). In other embodiments, wireless multicast proxy 102 can take other actions instead, for example by forwarding the IP multicast packet to WLAN 108 and the like.

But if the IP multicast destination address of the IP multicast packet is listed in multicast table 138, wireless multicast proxy 102 identifies one or more wireless clients 106 based on the IP multicast packet, and transmits a respective wireless unicast packet of the data in the IP multicast packet to each of the identified wireless clients. In particular, controller 126 of wireless multicast proxy 102 selects a unicast MAC address corresponding to the IP multicast address of the IP multicast packet from multicast table 138 (step 212). Packet circuit 140 makes a copy of the IP multicast packet (step 214) and inserts the selected unicast MAC address as the destination MAC address (step 216). Wireless output circuit 124 of wireless interface 116 wirelessly transmits the resulting packet (step 218). For example, referring to Table 1, if the IP multicast address is Multicast IP Address 1, wireless multicast proxy 102 selects Unicast MAC Address 1, and wirelessly transmits a copy of the IP multicast packet having Unicast MAC Address 1 as the MAC destination address.

Figure 3:
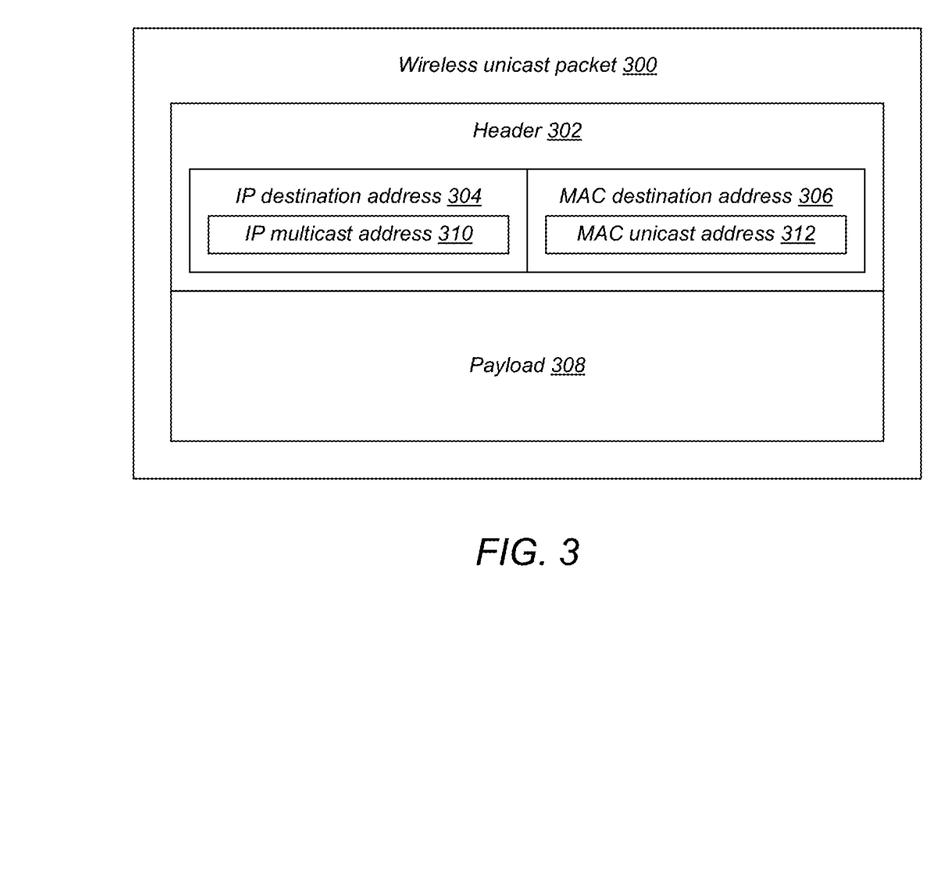
FIG. 3 shows the format of a wireless unicast packet transmitted wirelessly by the wireless multicast proxy of FIG. 1 according to an embodiment of the present invention.

FIG. 3 shows the format of a wireless unicast packet 300 transmitted wirelessly by wireless multicast proxy 102 of FIG. 1 according to an embodiment of the present invention. Referring to FIG. 3, wireless unicast packet 300 includes a header 302 comprising an IP destination address 304 and a MAC destination address 306, and a payload 308. IP destination address 304 includes an IP multicast address 310. MAC destination address 306 includes a MAC unicast address 312.

Referring again to FIG. 2, controller 126 then determines whether any unicast MAC addresses remain in the multicast group (step 220). For each remaining unicast MAC address in the multicast group, wireless multicast proxy 102 generates and sends a wireless unicast packet of the data in the IP multicast packet where the wireless unicast packet has that unicast MAC address as the destination MAC address (repeating steps 212-218). When no unicast MAC addresses remain in the multicast group, process 200 is done (step 222).

Figure 4:
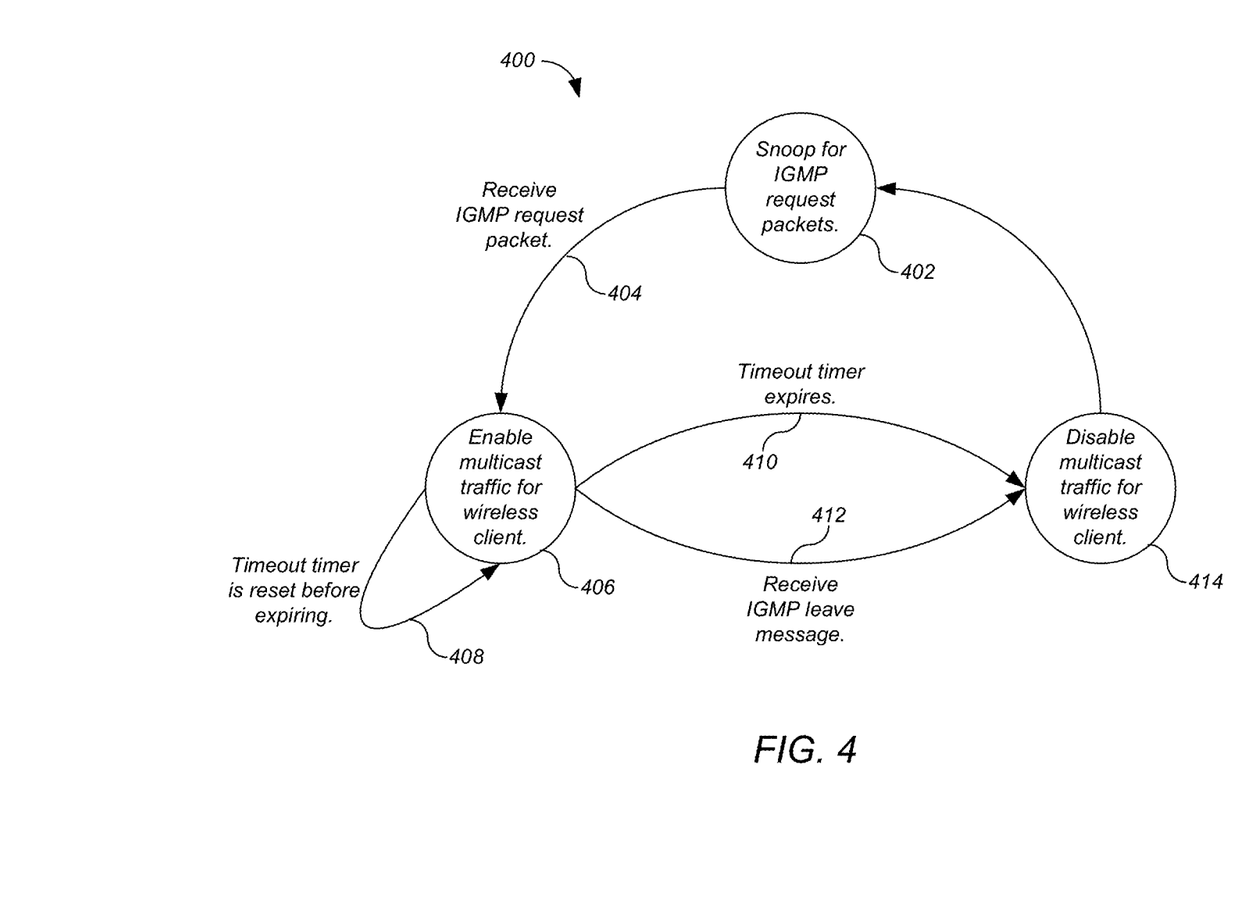
FIG. 4 shows a state machine for the multicast snoop circuit of FIG. 1 according to an embodiment of the present invention.

As mentioned above, multicast snoop circuit 128 of wireless multicast proxy 102 can populate and maintain multicast table 138 by snooping traffic on WLAN 108. FIG. 4 shows a state machine 400 for multicast snoop circuit 128 of FIG. 1 according to an embodiment of the present invention.

Referring to FIG. 4, multicast snoop circuit 128 snoops for IGMP request packets (at 402). Wireless clients 106 transmit IGMP request packets in order to join multicast groups, as is well-known in the relevant arts. When an IGMP request packet is received from a wireless client 106 (at 404), multicast snoop circuit 128 enables multicast traffic for that wireless client 106 (at 406). For example, if multicast table 138 does not contain an entry for the wireless client 106 in the multicast group, multicast snoop circuit 128 adds an entry to multicast table 138 and starts a timeout timer for the wireless client 106. But if multicast table 138 already contains an entry for the wireless client 106 in the multicast group, multicast snoop circuit 128 simply re-starts the timeout timer for the wireless client 106.

As long as the timeout timer is reset before expiring (at 408), multicast snoop circuit 128 keeps multicast traffic enabled for wireless client 106 (at 406). But if the timeout timer for the wireless client 106 in the multicast group expires (at 410), or if a IGMP leave message is received from the wireless client 106 for the multicast group (at 412), multicast snoop circuit 128 disables the wireless client 106 in the multicast group (at 414), for example by removing the entry for the wireless client 106 in the multicast group from multicast table 138. Multicast snoop circuit 128 continues to snoop for IGMP request packets (returning to 402).

Figure 5:
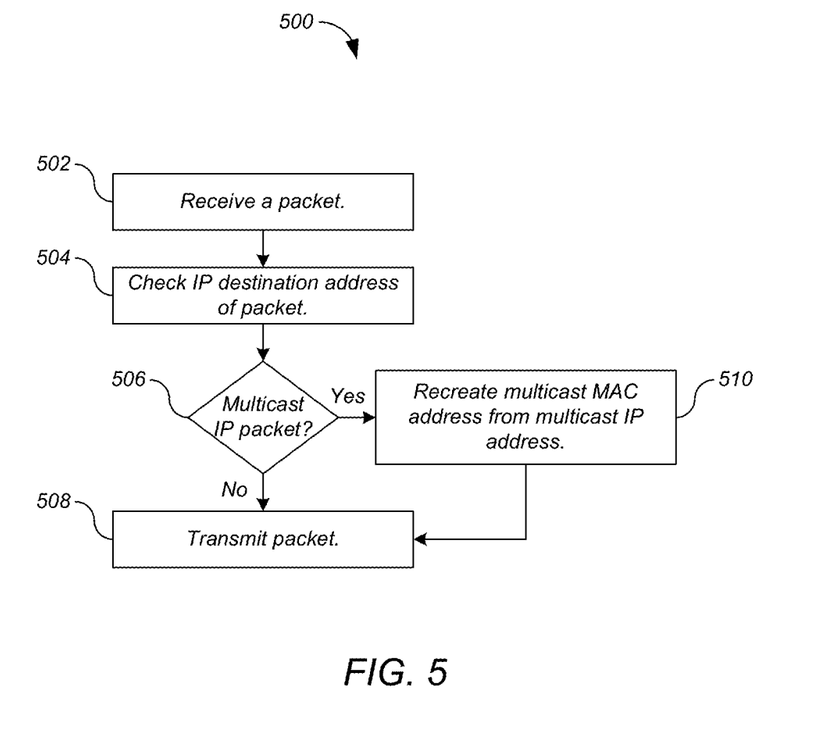
FIG. 5 shows a process for recreating the multicast address for a unicast packet according to an embodiment of the present invention.

In some cases it is desirable for wireless clients 106 to recreate the multicast address for unicast packets received from wireless multicast proxy 102 before forwarding the packets to client devices 110. For example, a client device 110 can include a switch, or an application executing on a client device 110 may not accept a unicast address. FIG. 5 shows a process 500 for recreating the multicast address for a unicast packet according to an embodiment of the present invention.

Figure 6:
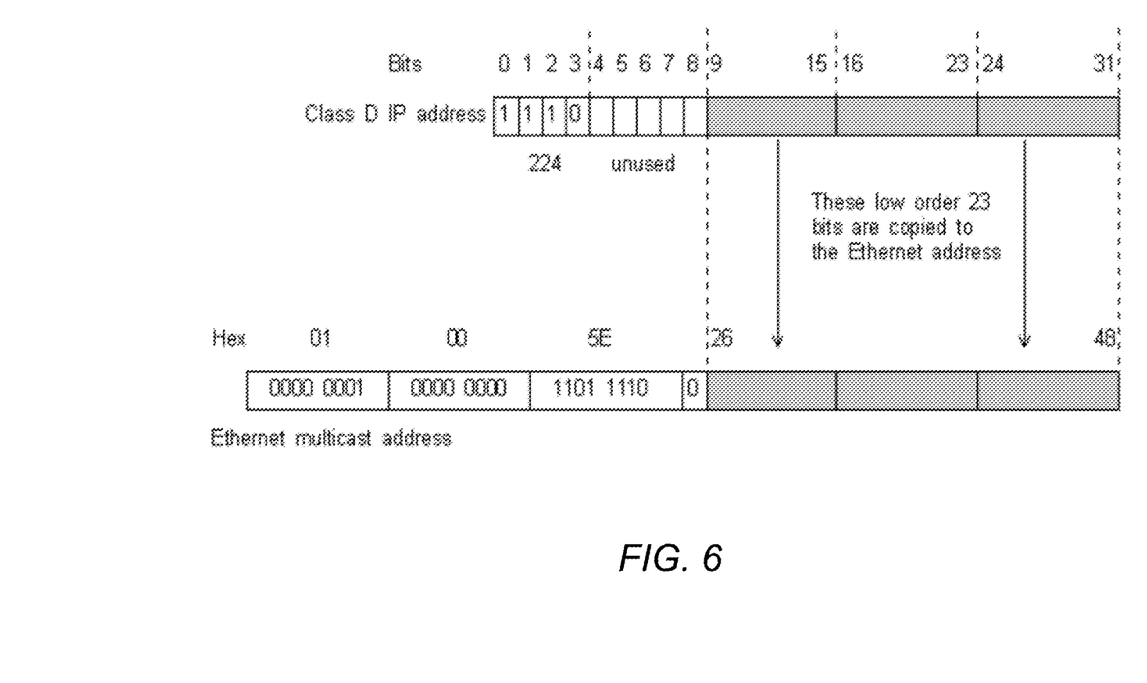
FIG. 6 illustrates the recreation of a multicast address for a unicast packet.

Referring to FIG. 5, a wireless client 106 receives a packet (step 502), and checks the IP destination address of the packet (step 504). If the packet is not a multicast IP packet (step 506), wireless client 106 transmits the packet to one or more client devices 110 (step 508). But if the packet is a multicast IP packet, wireless client 106 recreates the multicast MAC address from the multicast IP address (step 510) before transmitting the packet to client device(s) 110 (step 508). Referring to FIG. 1, address conversion circuit 142 generates a multicast MAC address based on the IP multicast destination, and address replacement circuit 144 replaces the MAC destination address of the packet with the multicast MAC address. FIG. 6 illustrates the recreation of a multicast address for a unicast packet. Referring to FIG. 6, the low-order 23 bits of the class D IP address are copied to bits 26-48 of the Ethernet multicast address, as is well-known in the relevant arts.

Figure 7A:
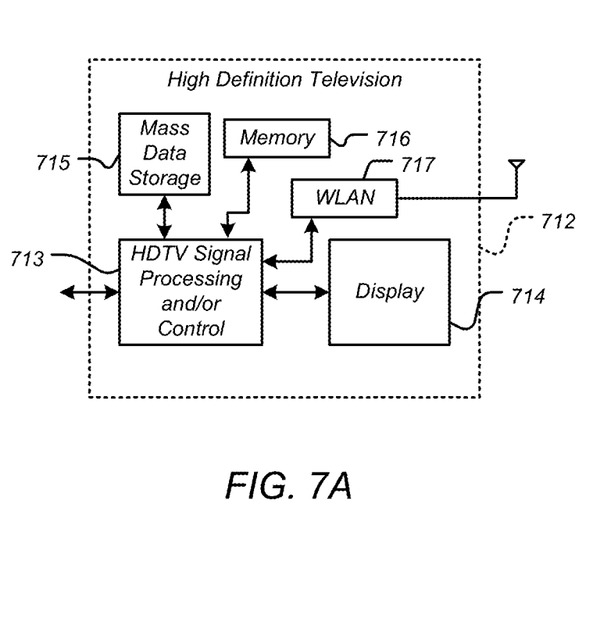
FIGS. 7A-7E show various exemplary implementations of the present invention.

FIGS. 7A-7E show various exemplary implementations of the present invention. Referring now to FIG. 7A, the present invention can be implemented in a high definition television (HDTV) 712. The present invention may implement either or both signal processing and/or control circuits, which are generally identified in FIG. 7A at 713, a WLAN interface 717 and/or mass data storage 718 of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, nonvolatile memory such as flash memory and/or other suitable electronic data storage. The HDTV 712 also may support connections with a WLAN via a WLAN network interface 717.

Figure 7B:
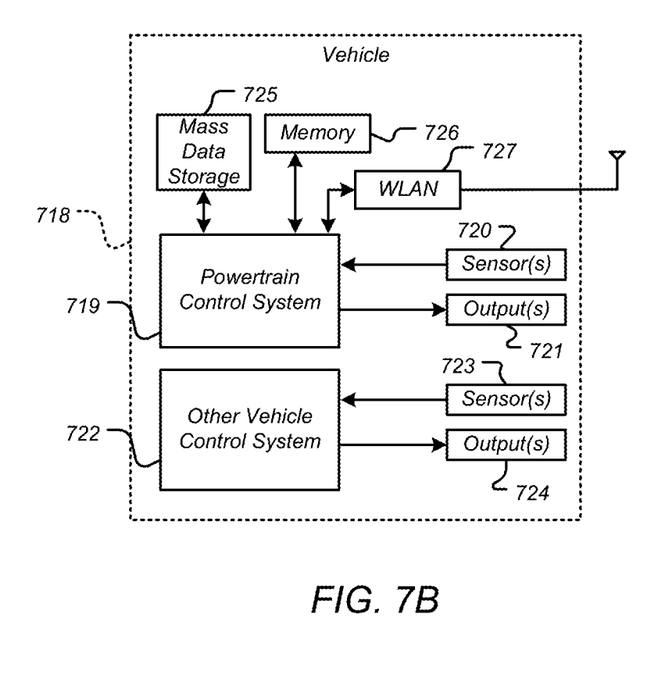

Referring now to FIG. 7B, the present invention implements a control system of a vehicle 718, a WLAN interface 727 and/or mass data storage 725 of the vehicle control system. In some implementations, the present invention implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 719 may communicate with mass data storage 725 that stores data in a nonvolatile manner. The mass data storage 725 may include optical and/or magnetic storage devices including HDDs and/or DVD drives. The HDD may be a mini HDD that includes one or more platters having a diameter that is smaller than approximately 1.8". The powertrain control system 719 may be connected to memory 726 such as RAM, ROM, nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
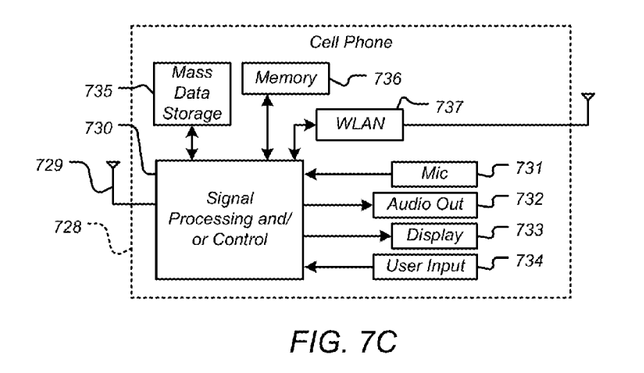

Referring now to FIG. 7C, the present invention can be implemented in a cellular phone 728 that may include a cellular antenna 729. The present invention may implement either or both signal processing and/or control circuits, which are generally identified in FIG. 7C at 730, a WLAN interface 737 and/or mass data storage 735 of the cellular phone 728. In some implementations, the cellular phone 728 includes a microphone 731, an audio output 732 such as a speaker and/or audio output jack, a display 733 and/or user input device 734 such as a keypad, pointing device, and/or voice actuation, for example. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices including HDDs and/or DVD drives. The HDD may be a mini HDD that includes one or more platters having a diameter that is smaller than approximately 1.8". The cellular phone 728 may be connected to memory 736 such as RAM, ROM, nonvolatile memory such as flash memory and/or other suitable electronic data storage. The cellular phone 728 also may support connections with a WLAN via a WLAN network interface 737.

Figure 7D:
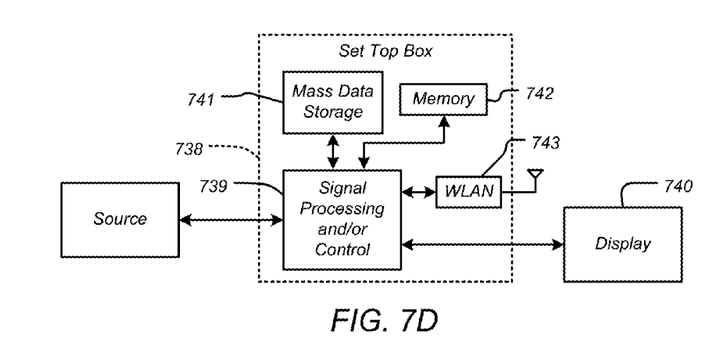

Referring now to FIG. 7D, the present invention can be implemented in a set top box 738. The present invention may implement either or both signal processing and/or control circuits, which are generally identified in FIG. 7D at 739, a WLAN interface 743 and/or mass data storage 741 of the set top box 738. The set top box 738 receives signals from a source such as a broadband source and outputs standard and/or high definition audio/video signals suitable for a display 740 such as a television, a monitor and/or other video and/or audio output devices. The signal processing and/or control circuits 739 and/or other circuits (not shown) of the set top box 738 may process data, perform coding and/or encryption, perform calculations, format data and/or perform any other set top box functions.

The set top box 738 may communicate with mass data storage 743 that stores data in a nonvolatile manner. The mass data storage 743 may include optical and/or magnetic storage devices including HDDs and/or DVD drives. The HDD may be a mini HDD that includes one or more platters having a diameter that is smaller than approximately 1.8". The set top box 738 may be connected to memory 742 such as RAM, ROM, nonvolatile memory such as flash memory and/or other suitable electronic data storage. The set top box 738 also may support connections with a WLAN via a WLAN network interface 743.

Figure 7E:
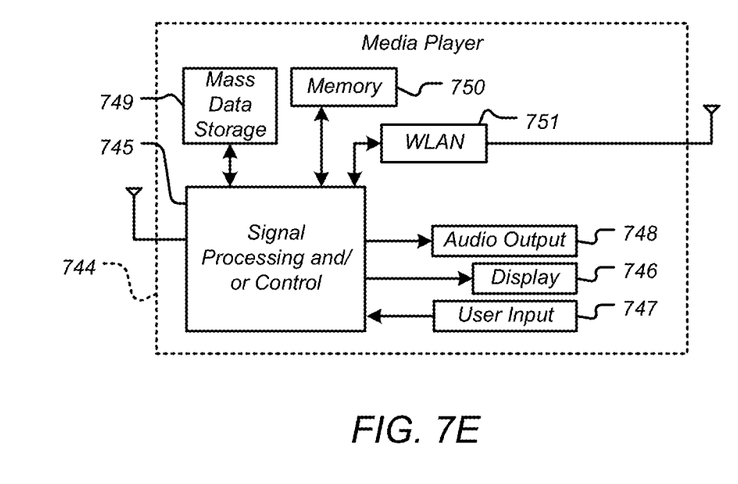

Referring now to FIG. 7E, the present invention can be implemented in a media player 744. The present invention may implement either or both signal processing and/or control circuits, which are generally identified in FIG. 7E at 745, a WLAN interface 751 and/or mass data storage 749 of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack. The signal processing and/or control circuits 745 and/or other circuits (not shown) of the media player 744 may process data, perform coding and/or encryption, perform calculations, format data and/or perform any other media player functions.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage 749 may include optical and/or magnetic storage devices including HDDs and/or DVD drives. The HDD may be a mini HDD that includes one or more platters having a diameter that is smaller than approximately 1.8". The media player 744 may be connected to memory 750 such as RAM, ROM, nonvolatile memory such as flash memory and/or other suitable electronic data storage. The media player 744 also may support connections with a WLAN via a WLAN network interface 751. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An access point comprising:
   a snoop circuit configured to
      generate a table including a plurality of entries corresponding to a plurality of wireless clients, wherein each entry in the table associates a MAC address of the corresponding wireless client with a multicast IP address;
      enable multicast traffic for a first wireless client of the plurality of wireless clients in response to receiving a first message from the first wireless client by
         i) adding an entry to the table for the first wireless client in response to the entry not existing in the table, and ii) starting a timeout timer for the first wireless client, or
         restarting the timeout timer in response to the entry for the first wireless client existing in the table;
      keep the multicast traffic for the first wireless client enabled as long as the timeout timer is reset before expiring; and
   an output circuit configured to transmit a packet of data to the first wireless client in response to (i) the multicast traffic for the first wireless client being enabled, and (ii) the packet of data being a multicast packet including the multicast IP address associated with the first wireless client in the entry in the table.

2. The access point of claim 1, wherein the snoop circuit is configured to disable the multicast traffic for the first wireless client by removing the entry for the first wireless client from the table in response to i) the timeout timer expiring, or ii) receiving a second message from the first wireless client.

3. The access point of claim 1, further comprising:
an input circuit configured to receive a first packet of data, wherein the first packet has an IP multicast destination address; and
a controller configured to identify one or more of the plurality of wireless clients based on i) the IP multicast destination address, and ii) unicast MAC addresses of the one or more of the plurality of wireless clients.

4. The access point of claim 3, further comprising:
a packet circuit configured to generate one or more second packets of the data by i) making a copy of the first packet, and ii) inserting, in the copy, one of the unicast MAC addresses as a destination MAC address,
wherein the output circuit is configured to transmit the one or more second packets of the data.

5. A system comprising:
the access point of claim 4; and
the one or more plurality of wireless clients,
wherein the one of the plurality of wireless clients comprises a receive circuit configured to receive one of the second packets,
wherein the one of the second packets includes i) the IP multicast destination address as an IP destination address, and ii) the one of the unicast MAC addresses as the destination MAC address.

6. The system of claim 5, wherein the one of the plurality of wireless clients further comprises an address conversion circuit configured to generate a multicast MAC address based on the IP multicast destination address by copying a predetermined number of bits of the IP multicast destination address to a portion of the multicast MAC address.

7. The system of claim 6, wherein the one of the plurality of wireless clients further comprises:
an address replacement circuit configured to replace the destination MAC address of the one of the second packets with the multicast MAC address; and
a transmit circuit configured to transmit the one of the second packets.

8. A method comprising:
generating, at an access point, a table including a plurality of entries corresponding to a plurality of wireless clients, wherein each entry in the table associates a MAC address of the corresponding wireless client with a multicast IP address;
enabling multicast traffic for a first wireless client of the plurality of wireless clients in response to receiving a first message from the first wireless client by
i) adding an entry to the table for the first wireless client in response to the entry not existing in the table, and ii) starting a timeout timer for the first wireless client, or
restarting the timeout timer in response to the entry for the first wireless client existing in the table;
keeping the multicast traffic for the first wireless client enabled as long as the timeout timer is reset before expiring; and
transmitting a packet of data to the first wireless client in response to (i) the multicast traffic for the first wireless client being enabled, and (ii) the packet of data being a multicast packet including the multicast IP address associated with the first wireless client in the entry in the table.

9. The method of claim 8, further comprising disabling the multicast traffic for the one of the wireless clients by removing the entry from the table in response to (i) the timeout timer expiring or (ii) receiving a second message from the one of the wireless clients.

10. The method of claim 8, further comprising:
receiving a first packet of data, wherein the first packet has an IP multicast destination address; and
identifying one or more wireless clients based on i) the IP multicast destination address, and ii) unicast MAC addresses of the one or more wireless clients.

11. The method of claim 10, further comprising:
generating one or more second packets of the data by i) making a copy of the first packet, and ii) inserting, in the copy, one of the unicast MAC addresses as a destination MAC address; and
transmitting the one or more second packets of the data.

12. The method of claim 11, further comprising receiving one of the second packets at one of the wireless clients, wherein the one of the second packets includes i) the IP multicast destination address as an IP destination address, and ii) the one of the unicast MAC addresses as the destination MAC address.

13. The method claim 12, further comprising generating, at the one of the wireless clients, a multicast MAC address based on the IP multicast destination address by copying a predetermined number of bits of the IP multicast destination address to a portion of the multicast MAC address.

14. The method of claim 13, further comprising:
replacing, at the one of the wireless clients, the destination MAC address of the one of the second packets with the multicast MAC address; and
transmitting the one of the second packets from the one of the wireless clients.

* * * * *